United States Patent [19]

Folcik

[11] Patent Number: 5,064,239
[45] Date of Patent: Nov. 12, 1991

[54] SUNSCREEN FOR MOTOR VEHICLES

[76] Inventor: Charles P. Folcik, 69 Northwest Dr. #55, Plainville, Conn. 06062

[21] Appl. No.: 579,280

[22] Filed: Sep. 6, 1990

Related U.S. Application Data

[63] Continuation of Ser. No. 419,726, Oct. 11, 1989, abandoned.

[51] Int. Cl.⁵ ............................................. B60J 3/00
[52] U.S. Cl. ................................. 296/97.7; 296/97.9; 160/370.2
[58] Field of Search ............... 296/97.7, 97.9, 97.1; 150/166; 160/370.2, DIG. 2, DIG. 3; 248/205.2; 24/306; 297/DIG. 6; 52/DIG. 13

[56] References Cited

U.S. PATENT DOCUMENTS

| | | | |
|---|---|---|---|
| 1,987,259 | 1/1935 | Koehler | 296/97.7 X |
| 2,717,036 | 9/1955 | Harris | 160/DIG. 2 X |
| 2,944,601 | 7/1960 | Compson | 160/370.2 |
| 3,184,264 | 5/1965 | Ealey et al. | 160/370.2 X |
| 3,753,458 | 8/1973 | Lazaiek | 160/DIG. 2 |
| 3,863,304 | 2/1975 | Brumlik | 24/450 |
| 4,109,957 | 8/1978 | Polizzi et al. | 296/95.1 |
| 4,172,613 | 10/1979 | Furando | 296/97.7 |
| 4,202,396 | 5/1980 | Levy | 296/97.7 X |
| 4,690,451 | 9/1987 | Killar | 296/97.6 |
| 4,751,115 | 6/1988 | Smith et al. | 296/97.7 X |
| 4,759,581 | 7/1988 | McNamee | 296/97.7 |
| 4,790,591 | 12/1988 | Miller | 160/370.2 |
| 4,811,982 | 3/1989 | Carlyle | 296/97.7 X |
| 4,821,785 | 4/1989 | Rolan | 150/166 |
| 4,827,997 | 5/1989 | Rolan | 150/166 |

Primary Examiner—Margaret A. Focarino
Assistant Examiner—Joseph D. Pape
Attorney, Agent, or Firm—Burns, Doane, Swecker & Mathis

[57] ABSTRACT

A sunscreen for a motor vehicle window includes a sheet of flexible, stretchable, opaque material that has a weave that is adapted to adhere directly to the hook portion of a hook and loop fastener, the sheet of material having a slit therein for accommodating a rear view mirror. A plurality of pieces of fastener are mounted on each corner of the window with an adhesive for adhering the material to the window. The fastener is preferably the hook portion of a hook and loop fastener.

39 Claims, 2 Drawing Sheets

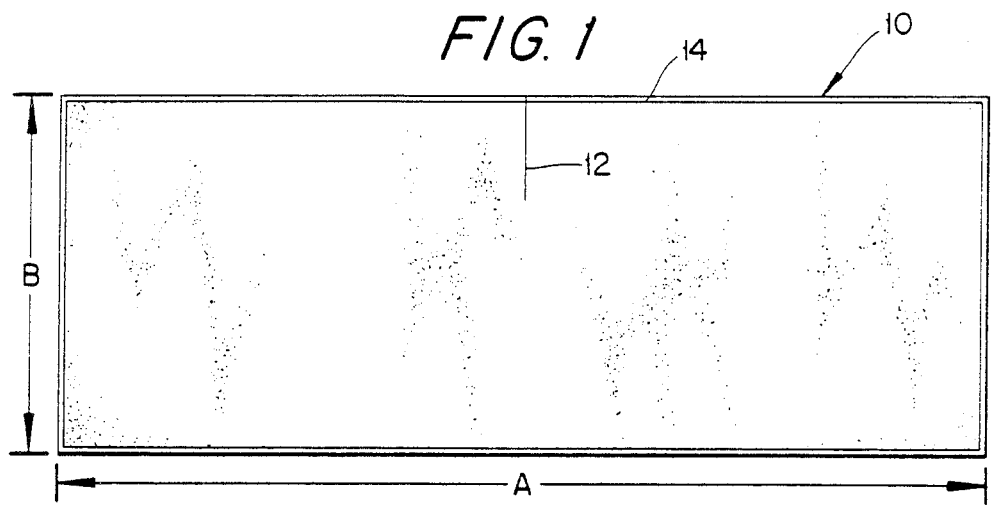
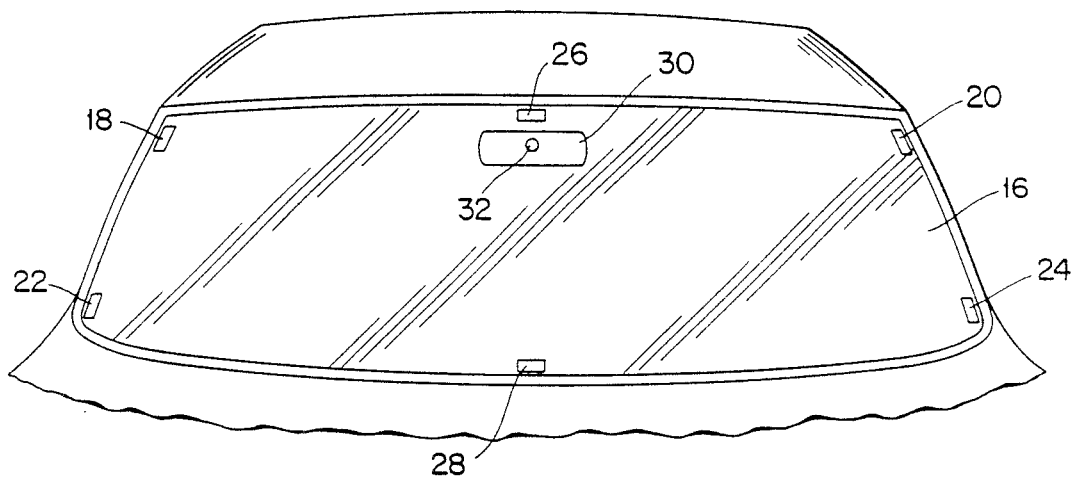
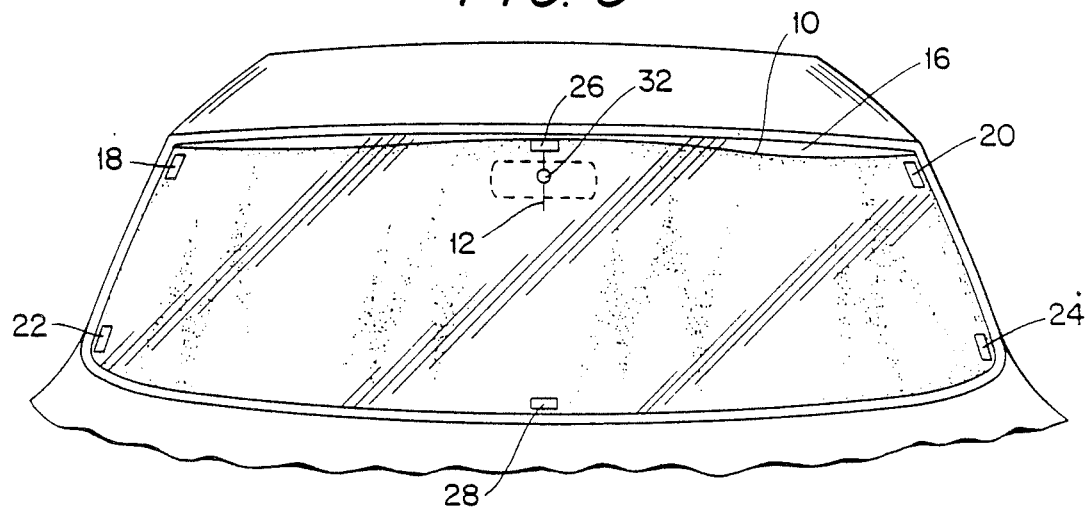

SUNSCREEN FOR MOTOR VEHICLES

This application is a continuation of application Ser. No. 419,726 filed Oct. 11, 1989, now abandoned.

BACKGROUND OF THE INVENTION

1. Field of the Invention

This invention relates to sunscreens, and more particularly, to sunscreens for protecting the interior of motor vehicles against the sun's rays.

2. Description of Related Art

Sunscreens for motor vehicles can be categorized into two categories. The first category covers sunscreens that are intended to keep the sun's rays from damaging the interior of the vehicle or to prevent the interior of the vehicle from becoming excessively hot when the vehicle is not in use. The second category covers sunscreens that are intended to protect occupants of the vehicle from irritating rays of the sun when the vehicle is in use. The present invention relates to both categories of sunscreens.

A well known sunscreen of the first category is disclosed in U.S. Pat. No. 4,202,396, issued to Levy on May 13, 1980. That patent discloses a foldable sun shield for motor vehicles that comprises a substantially rectangular piece of cardboard that is folded along a plurality of fold lines extending in the vertical direction so that the sun shield can be folded into a small package for storage and then unfolded into a shape that approximately fits the front windshield of an automobile. Disadvantages of this device include the fact that the disclosed sun shield does not fit exactly within most windshields, thus allowing some of the sun's rays to come in around the shield; the device is difficult to mount in some motor vehicles, particularly those wherein the rear view mirror is mounted to the windshield directly; and the disclosed sun shield is easily bent or damaged thus destroying its effectiveness.

Another automobile sun shield of the first category is disclosed in U.S. Pat. No. 4,790,591, issued to Miller on Dec. 13, 1988. That patent discloses a flexible sheet comprised of a metallized plastic film that is specifically formed to the exact shape of a windshield. The flexible sheet is provided at several locations with one-half of a conventional hook and loop (VELCRO) fastener. The other half of the hook and loop fastener is mounted on the windshield of the automobile at locations corresponding to the locations on the flexible sheet having the other halves of the hook and loop fasteners. Disadvantages of that windshield screen include the fact that the flexible sheet must be custom designed for each model of automobile, thus minimizing the ability to mass produce the windshield effectively; and that the placement of the hook and loop fasteners must be carefully aligned between the windshield and the flexible sheet.

U.S. Pat. No. 4,759,581, issued to McNamee on July 26, 1988, discloses a sunscreen similar to that disclosed by Miller. This sunscreen is primarily intended for use on recreational vehicles. It also suffers from the disadvantage of the Miller device in that it requires both halves of a hook and loop fastener, which must be carefully positioned on both the vehicle and the sunscreen.

Sunscreens of the second category, i.e., those intended to protect the occupants of the vehicle from irritating rays include the convertible sun visor disclosed in U.S. Pat. No. 4,690,451, issued to Killar on Sept. 1, 1987. That patent discloses a convertible sun visor that can be mounted to an automobile body interior with an auxiliary mount means, or which by the addition of accessory mounting clips can be secured to a conventional sun visor already mounted in an automobile. A disadvantage of the Killar sun visor is that it is difficult to install on an automobile.

Another sun visor for an automobile is disclosed in U.S. Pat. No. 4,172,613, issued to Furando on Oct. 30, 1979. The Furando visor includes a panel for straddling the rear view mirror mounted on the automobile windshield so as to prevent sun from shining through onto the driver from a location on the windshield between the two conventional sun visors. The Furando sun shield is mounted to the windshield by either suction cups or adhesive. The Furando sun visor performs the very limited function of only preventing sun from shining through between the two conventional sun visors.

There are also a large number of products on the market that are intended to be mounted to the side windows of an automobile in order to prevent sun from shining on an infant that is mounted in a car seat. Such devices are usually mounted to the windshield by means of suction cups or adhesive tape. Such sun shields are frequently expensive, difficult to mount, or difficult to remove and store when not in use.

SUMMARY OF THE INVENTION

In view of the foregoing limitations and shortcomings of the prior art devices, as well as other disadvantages not specifically mentioned above, it should be apparent that prior to the present invention there existed a need in the art for a simple automobile sunscreen that is convenient to mount, dismount, and store, and that is versatile so that it can be used on a variety of windshields of different sizes and designs. It is therefore, a primary object of this invention to fulfill that need by providing such a device.

Briefly described, the present invention relates to a sunscreen for an automobile windshield that is preferably made from a stretchable fabric so that one size sunscreen may be stretched to fit all conventional automobile windscreens. In addition, the sunscreen is preferably made from a material that is adapted to adhere to the hook portion of a conventional hook and loop fastener. Accordingly, small sections of the hook portion of a hook and loop fastener may be adhered to various locations on an automobile windshield. The flexible and stretchable material is then merely pressed against the hook fasteners for convenient mounting to the windshield. When not in use, the sunscreen can be easily removed from the hook fasteners and rolled up for convenient storage. The hook fasteners, may be placed in unobtrusive locations on the windshield and may be permanently left there.

The nature of the invention may be more clearly understood by reference to the following detailed description of the invention, the appended claims, and the several views illustrated in the attached drawings.

BRIEF DESCRIPTION OF THE DRAWINGS

FIG. 1 is a view of a sheet of material prepared for use as a sunscreen according to the present invention;

FIG. 2 is a perspective view of an automobile windshield adapted to receive the material of FIG. 1;

FIG. 3 is a perspective view of an automobile windshield having the sunscreen of the present invention mounted thereon;

DETAILED DESCRIPTION OF THE PREFERRED EMBODIMENTS

Figure 4:
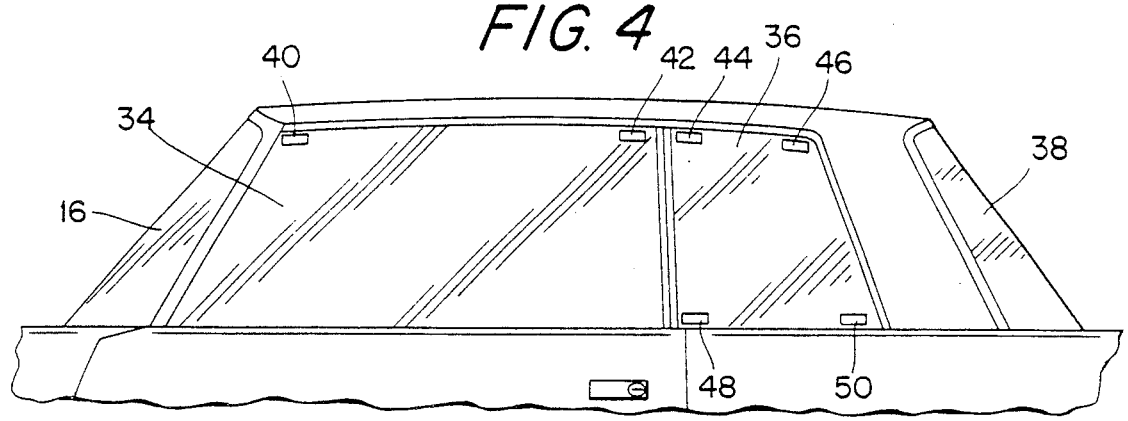
FIG. 4 is a side view of an automobile wherein the windows have been adapted for receiving sunscreens according to the present invention.

With reference to FIG. 1, a sheet of material prepared for use as a sunscreen according to the present invention is generally designated by reference numeral 10.

The material is preferably stretchable and flexible so that it can be quickly and conveniently mounted to an automobile windshield, and quickly and easily dismounted for convenient storage. According to a first preferred embodiment, the flexible material of the sunscreen is preferably eighty percent nylon and twenty percent lycra. One trademark for such a material is TRICOT.

The sheet 10 is preferably made from a material that is able to adhere to the hook portion of a conventional hook and loop (VELCRO) fastener. The prepared sheet of material 10 preferably measures sixty-six inches along the width A and twenty-four inches along the height B. A slit 12 eight inches in length is preferably made at the center of one of the longer lengths of the sheet 10 and extends towards the center of the sheet 10.

The material from which the sheet 10 is made is preferably able to stretch in both the horizontal and vertical directions by approximately twenty percent. As a result of being stretchable, the sheet 10 can be used on windshields that are wider than sixty-six inches in width and/or that are taller than twenty-four inches in height. Thus, it is not necessary that the shape or size of the sheet 10 be custom designed for each windshield on which it is to be used. Instead, one standard size can be manufactured for use on practically all automobile models.

Although not necessary, the sheet 10 can be finished with an overlock stitch 14, or other finishing method, along the perimeter thereof. Such a finishing protects the material from fraying and enhances the aesthetics of the sunscreen.

With reference to FIG. 2, hook portions 18, 20, 22, 24, 26, 28 of a conventional hook and loop fastener are mounted at various locations on a conventional automobile windshield 16. The size of the fasteners is not critical, although it has been found that strips two inches in length work well. The locations are preferably chosen so as not to interfere with the vision of the driver or other occupants of the vehicle. In fact, the fasteners may be mounted on portions of the automobile adjacent the windshield, instead of on the windshield itself. In the first preferred embodiment, the hook fasteners 18, 20, 22, 24, 26, 28 are mounted in each of the four corners and in the center of the windshield along the top and bottom edges. Such hook fasteners can be purchased with adhesive backing thereon for simple mounting to the automobile windshield 16.

With reference to FIG. 3, when the automobile is not in use, the sheet 10 may be unrolled or unfolded and simply adhered to the hook fasteners 18, 20, 22, 24, 26, 28 by pressing the sheet 10 against the fasteners for mounting onto the windshield 16. Note that the stem 32 of the rear view mirror 30 is able to project through the slit 12 of the sheet 10. If the sheet 10 is wider than the windshield 16 on which it is used, the extra width of the sheet 10 may simply be suspended loosely at the edges thereof. If the sheet 10 is taller than the height of the windshield 16, the excess material may simply be draped on the dashboard. If the sheet 10 is smaller than the windshield 16 on which it is to be mounted, the sheet 10 can be stretched by up to twenty percent to fit the windshield 16.

If desired, decorative logos or advertising may be printed or otherwise attached to the sheet 10 for either aesthetic purposes or to function as a mobile billboard.

To remove the sunscreen, the sheet 10 is simply pulled off of the hook fasteners 18, 20, 22, 24, 26, 28, and may thus be rolled up or folded and stored in a convenient location. The hook fasteners 18, 20, 22, 24, 26, 28 may remain in place on the windshield 16 when the sunscreen is not in use since the hook fasteners are preferably located in unobtrusive locations.

Turning attention now to FIG. 4, the present invention may also be used on the side or rear windows of an automobile. For example, in an automobile window, such as a window 34 on a door, wherein the window 34 is capable of being rolled up and down, the user would most likely only want to install hook fasteners 40, 42 at the top edge of the window 34. This would avoid having the fasteners 40, 42 interfere with the up and down operation of the window 34. Of course, in this situation, it may not be possible to completely lower the window. However, for side windows 36 that are not capable of being opened, hook fasteners 44, 46, 48, 50 may be placed in all four corners of the window 36. As indicated earlier, the fasteners may also be placed on portions of the automobile that are adjacent the windows, as opposed to placing the fasteners directly on the windows. Although not shown in the drawings, the present invention can be similarly applied to the rear windshield of an automobile.

Figure 5:
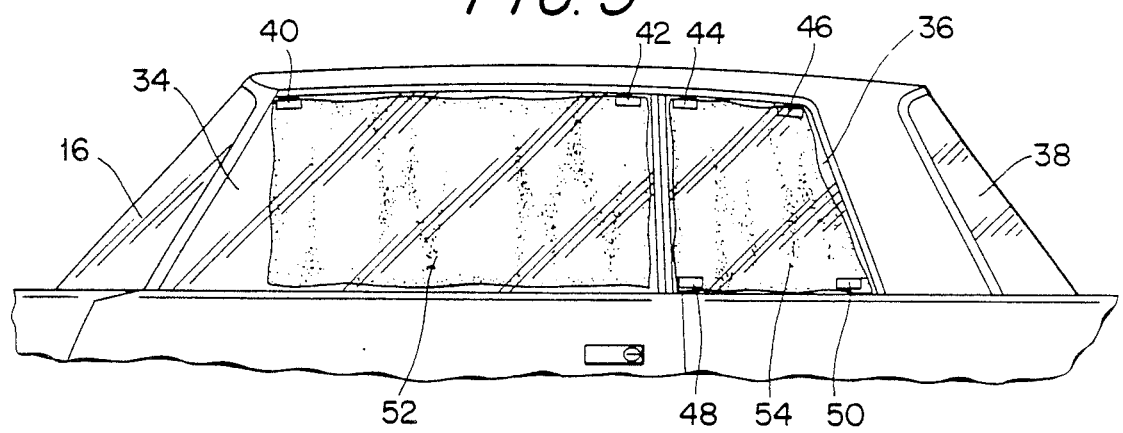
FIG. 5 is a side view of an automobile having sunscreens according to the present invention mounted thereon.
Figure 6:
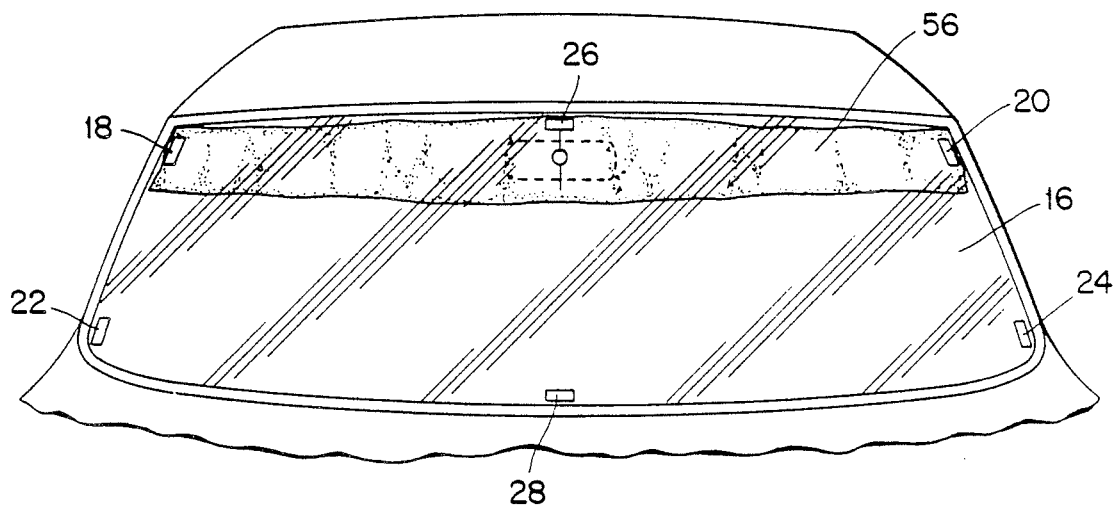
FIG. 6 is a perspective view of an automobile having an alternative embodiment of the sunscreen of the present invention mounted thereon.

Turning attention now to FIG. 5, a sheet of material 52, preferably of the type described above with respect to the sheet 10, is shown mounted on fasteners 40, 42. The sheet 52 may be either opaque for use when the vehicle is not in motion, or may be a sheer material that is capable of shielding some of the suns rays while not totally obstructing the view through the window.

A smaller sheet 54 may be mounted to the fasteners 44, 46, 48, 50 in the rear, nonmovable window 36. Similar to the sheet 52, the sheet 54 may be either opaque or sheer. Use of the present invention on automobile side windows is particularly well adapted for situations where infants may be riding in car seats. In those situations, it is useful to have a convenient, easy to mount screen to block the sun from the infant's eyes.

In another preferred embodiment of the present invention, a relatively narrow strip of material 56 may be mounted to the top fasteners 18, 20, 26 of the front windshield of an automobile. Such a screen is useful for blocking the sun from the vehicle occupant's eyes during operation of the vehicle. The sheet 56 is preferable to the standard visors that are mounted in the automobile because the sheet extends along the entire width of the windshield, in contrast to the visors which usually extend for only a specific portion of the windshield.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A sunscreen for a nonretractable motor vehicle window, comprising:
   a sheet of flexible and stretchable, elastic material that is substantially opaque to solar radiation; and
   a plurality of means mounted on the motor vehicle for adhering the sheet of material to the window, said adhering means being spaced from each other so that there are gaps between each of said adhering means to facilitate mounting the stretchable, elastic material;
   said sheet of material being constructed such that any portion of the sheet will adhere to the adhering means upon contact therewith;
   wherein said sheet of material may be repeatedly adhered to the plurality of adhering means and removed therefrom without damage to either the material or the adhering means.

2. The sunscreen according to claim 1, wherein the material is of a size that is at least as large as approximately 83% of the portion of the window that is to be protected by the sunscreen.

3. The sunscreen according to claim 1, wherein the material is able to stretch at least 20%.

4. The sunscreen according to claim 1, wherein the material is 80% nylon and 20% lycra.

5. The sunscreen according to claim 1, wherein a small portion of adhering means is mounted in each corner of the window.

6. The sunscreen according to claim 1, wherein the material includes means for accommodating a rear view mirror.

7. The sunscreen according to claim 1, wherein the adhering means is the hook portion of a hook and loop fastener.

8. The sunscreen according to claim 7, wherein the adhering means is mounted on the window with an adhesive.

9. The sunscreen according to claim 7, wherein the material has a weave that adheres directly to the hook portion of a hook and loop fastener upon contact therewith.

10. The sunscreen according to claim 1, wherein the sheet of material has an overlock stitch around the periphery thereof.

11. The sunscreen according to claim 1, wherein the material adheres to the adhering means by pressing the material onto the adhering means.

12. The sunscreen according to claim 1, wherein the sheet of material has printing thereon.

13. A sunscreen for a nonretractable motor vehicle window, comprising:
   a sheet of flexible and stretchable, elastic material that is substantially opaque to solar radiation and has a weave that adheres directly to the hook portion of a hook and loop fastener upon contact therewith;
   a plurality of means mounted on the motor vehicle for adhering the sheet of material to the window, said adhering means being the hook portion of a hook and loop fastener, said adhering means being spaced from each other so that there are gaps between each of said adhering means.

14. The sunscreen according to claim 13, wherein the material is able to stretch at least 20%.

15. The sunscreen according to claim 13, wherein the sheet of material is of a size that is at least as large as approximately 83% of the portion of the window that is to be protected by the sunscreen.

16. The sunscreen according to claim 13, wherein the material is 80% nylon and 20% lycra.

17. The sunscreen according to claim 13, wherein a small portion of adhering means is mounted in each corner of the window.

18. The sunscreen according to claim 13, wherein the material includes means for accommodating a rear view mirror.

19. The sunscreen according to claim 6, wherein the means for accommodating a rear view mirror comprises a slit formed in the piece of material.

20. The sunscreen according to claim 7, wherein the adhering means is mounted on the window with an adhesive.

21. The sunscreen according to claim 13, wherein the sheet of material has an overlock stitch around the periphery thereof.

22. The sunscreen according to claim 13, wherein the material adheres directly to the adhering means by pressing the material onto the adhering means.

23. The sunscreen according to claim 13, wherein the material has printing thereon.

24. A sunscreen for a nonretractable motor vehicle window, comprising:
   a sheet of flexible, stretchable, opaque, elastic material that has a weave that adheres directly to the hook portion of a hook and loop fastener upon contact therewith;
   said sheet of material having a slit therein for accommodating a rear view mirror; and
   means mounted on each corner of the window with an adhesive for adhering the sheet of material to the window, said adhering means being the hook portion of a hook and loop fastener, said adhering means being spaced from each other so that there are gaps between each of said adhering means to facilitate mounting the stretchable, elastic material.

25. The sunscreen according to claim 24, wherein the material is 80% nylon and 20% lycra.

26. The sunscreen according to claim 24, wherein the sheet of material is of a size that is at least as large as approximately 83% of the portion of the window that is to be protected by the sunscreen.

27. A visor for a motor vehicle window, comprising:
   a sheet of flexible, elastic material of a width that is substantially equal to the width of the window and a height that is less than the height of the window;
   means mounted at the top of the window for adhering the sheet of material to the top of the window, said adhering means being the hook portion of a hook and loop fastener;
   wherein the material has a weave that adheres directly to the hook portion of a hook and loop fastener upon contact therewith.

28. The visor according to claim 27, wherein the adhering means is mounted on the window with an adhesive.

29. The visor according to claim 27, wherein the material is opaque.

30. The visor according to claim 27, wherein the material is sheer.

31. A method of shielding a nonretractable motor vehicle window, comprising the steps of:

providing a plurality of fasteners and a sheet of flexible and stretchable, elastic material, said sheet of material being substantially opaque to solar radiation and constructed such that any portion of the sheet will adhere to the fasteners upon contact therewith;

mounting the fasteners to the window that is to be shielded such that there is a gap between each fastener; and fastening the sheet of flexible and stretchable, elastic material at any portion thereof to the plurality of fasteners in order to cover the window with the sheet of material.

32. The method according to claim 31, wherein the mounting step includes mounting to the window with an adhesive the hook portion of a hook and loop fastener.

33. The method according to claim 31, wherein the mounting step includes mounting a fastener to each corner of the portion of the window that is to be shielded.

34. The method according to claim 31, wherein the material has a weave that adheres to the hook portion of a hook and loop fastener upon contact therewith and the fastening step includes pressing the material against the fasteners.

35. The method according to claim 31, further comprising the step of stretching the sheet of material to the shape of the portion of the window that is to be protected prior to fastening the material to the fasteners.

36. A method of shielding a nonretractable motor vehicle window, comprising the steps of:

mounting a plurality of pieces of the hook portion of a hook and loop fastener to the window that is to be shielded such that there is a gap between each piece; and pressing against the plurality of pieces a sheet of flexible, elastic material that is substantially opaque to solar radiation and that has a weave that adheres directly to the hook portion of a hook and loop fastener upon contact therewith.

37. The method according to claim 36, wherein the mounting step includes mounting a piece of fastener to each corner of the portion of the window that is to be shielded.

38. The method according to claim 36, further comprising the step of stretching the sheet of material to the shape of the portion of the window that is to be protected prior to fastening the material to the fasteners.

39. A sunscreen for a nonretractable motor vehicle window, comprising:

a sheet of flexible, elastic material that is substantially opaque to solar radiation and that is able to stretch approximately 20% and that has a weave that adheres directly to the hook portion of a hook and loop fastener; and a plurality of means mounted on the motor vehicle for adhering the sheet of material to the window, said adhering means being the hook portion of a hook and loop fastener and being spaced from each other so that there are gaps between each of said adhering means to facilitate mounting the stretchable, elastic material;

said sheet of material being constructed such that any portion of the sheet will adhere to the adhering means upon contact therewith;

wherein said sheet of material may be repeatedly adhered to the plurality of adhering means and removed therefrom without damage to either the material or the adhering means.

* * * * *